(12) United States Patent
Weber et al.

(10) Patent No.: US 10,053,990 B2
(45) Date of Patent: Aug. 21, 2018

(54) INTERNAL RIB WITH DEFINED CONCAVE SURFACE CURVATURE FOR AIRFOIL

(71) Applicant: General Electric Company, Schenectady, NY (US)

(72) Inventors: David Wayne Weber, Simpsonville, SC (US); Gregory Thomas Foster, Greer, SC (US); Michelle Jessica Iduate, Simpsonville, SC (US); Brendon James Leary, Simpsonville, SC (US); Jacob Charles Perry, II, Taylors, SC (US)

(73) Assignee: General Electric Company, Schenectady, NY (US)

( * ) Notice: Subject to any disclaimer, the term of this patent is extended or adjusted under 35 U.S.C. 154(b) by 348 days.

(21) Appl. No.: 15/152,707

(22) Filed: May 12, 2016

(65) Prior Publication Data

US 2017/0328220 A1    Nov. 16, 2017

(51) Int. Cl.
| | |
|---|---|
| *F01D 5/18* | (2006.01) |
| *F01D 5/14* | (2006.01) |
| *F01D 9/02* | (2006.01) |
| *F01D 25/12* | (2006.01) |

(52) U.S. Cl.
CPC ............ *F01D 5/187* (2013.01); *F01D 5/141* (2013.01); *F01D 5/147* (2013.01); *F01D 9/02* (2013.01); *F01D 25/12* (2013.01); *F05D 2220/32* (2013.01); *F05D 2240/305* (2013.01); *F05D 2240/306* (2013.01); *F05D 2250/185* (2013.01); *F05D 2250/711* (2013.01); *F05D 2250/712* (2013.01); *F05D 2260/201* (2013.01); *F05D 2260/202* (2013.01); *F05D 2260/22141* (2013.01)

(58) Field of Classification Search
CPC ................................. F01D 5/187; F01D 5/147
USPC ......................................................... 416/97 R
See application file for complete search history.

(56) References Cited

U.S. PATENT DOCUMENTS

| | | | |
|---|---|---|---|
| 7,377,746 B2 * | 5/2008 | Brassfield | B22C 9/043 29/888.024 |
| 7,753,650 B1 * | 7/2010 | Liang | F01D 5/187 416/97 R |
| 8,123,489 B2 * | 2/2012 | Udall | F01D 5/147 29/889.72 |

(Continued)

FOREIGN PATENT DOCUMENTS

EP    2933435 A1 * 10/2015 ............ F01D 5/188

*Primary Examiner* — Woody Lee, Jr.
(74) *Attorney, Agent, or Firm* — Ernest G. Cusick; Hoffman Warnick LLC

(57) ABSTRACT

An internal rib for a blade airfoil has a concave surface defined to ensure durability and provide desired heat transfer. A concave surface faces a pressure side or suction side outer wall. A width is between a first end and a second end, and a depth is a length of a normal depth line between a midpoint of the concave surface and an intersection point of the depth line with the pressure or suction side outer wall. An irregular arc is defined within an arc angle centered at the intersection point, the irregular arc has a first arc radius equivalent to the depth at the midpoint of the concave surface and a second arc radius where the arc angle intersects the concave surface equivalent to a product of the depth and a shape factor. The shape factor has a substantially linear relationship with the aspect ratio.

6 Claims, 8 Drawing Sheets

(56) References Cited

U.S. PATENT DOCUMENTS

| | | | |
|---|---|---|---|
| 9,267,381 B2* | 2/2016 | Morris | F01D 5/183 |
| 9,759,071 B2* | 9/2017 | Wichmann | F01D 5/187 |
| 9,765,642 B2* | 9/2017 | Smith | F01D 25/12 |
| 9,879,547 B2* | 1/2018 | Potter | F01D 5/187 |
| 2011/0236221 A1* | 9/2011 | Campbell | F01D 5/148 |
| | | | 416/97 R |
| 2015/0184519 A1* | 7/2015 | Foster | F01D 5/187 |
| | | | 416/96 R |
| 2015/0184523 A1* | 7/2015 | Wassynger | F01D 5/187 |
| | | | 416/96 R |
| 2015/0184537 A1* | 7/2015 | Smith | F01D 25/12 |
| | | | 416/97 R |

* cited by examiner

INTERNAL RIB WITH DEFINED CONCAVE SURFACE CURVATURE FOR AIRFOIL

BACKGROUND OF THE INVENTION

This disclosure relates to blade airfoils, and more particularly to hollow turbine airfoils, such as rotor or stator blades, having internal channels for passing fluids such as air to cool the airfoils. More particularly, the disclosure relates to an internal rib having a concave surface or curvature configured to a standard to ensure durability and desired heat transfer.

Combustion or gas turbine engines (hereinafter "gas turbines") include a compressor, a combustor, and a turbine. As is well known in the art, air compressed in the compressor is mixed with fuel and ignited in the combustor and then expanded through the turbine to produce power. The components within the turbine, particularly the circumferentially arrayed rotor and stator blades, are subjected to a hostile environment characterized by the extremely high temperatures and pressures of the combustion products that are expended therethrough. In order to withstand the repetitive thermal cycling as well as the extreme temperatures and mechanical stresses of this environment, the airfoils must have a robust structure and be actively cooled.

As will be appreciated, turbine rotor and stator blades often contain internal passages or circuits that form a cooling system through which a coolant, typically air bled from the compressor, is circulated. Such cooling circuits are typically formed by internal ribs that provide the required structural support for the airfoil, and include multiple flow path arrangements to maintain the airfoil within an acceptable temperature profile. The air passing through these cooling circuits often is vented through film cooling apertures formed on the leading edge, trailing edge, suction side, and pressure side of the airfoil.

It will be appreciated that the efficiency of gas turbines increases as firing temperatures rise. Because of this, there is a constant demand for technological advances that enable blades to withstand ever higher temperatures. These advances sometimes include new materials that are capable of withstanding the higher temperatures, but just as often they involve improving the internal configuration of the airfoil so to enhance the blades structure and cooling capabilities. However, because the use of coolant decreases the efficiency of the engine, new arrangements that rely too heavily on increased levels of coolant usage merely trade one inefficiency for another. As a result, there continues to be demand for new airfoil arrangements that offer internal airfoil configurations and coolant circulation that improves coolant efficiency.

A consideration that further complicates arrangement of internally cooled airfoils is the temperature differential that develops during operation between the airfoils internal and external structure. That is, because they are exposed to the hot gas path, the external walls of the airfoil typically reside at much higher temperatures during operation than many of the internal ribs, which, for example, may have coolant flowing through passages defined to each side of them. In fact, a common airfoil configuration includes a "four-wall" arrangement in which lengthy inner ribs run parallel to the pressure and suction side outer walls. It is known that high cooling efficiency can be achieved by the near-wall flow passages that are formed in the four-wall arrangement. A challenge with the near-wall flow passages is that the outer walls experience a significantly greater level of thermal expansion than the inner walls. Various rib configurations have been devised to address these challenges. In particular, internal rib curvature shapes must be optimized to balance cooling and durability.

BRIEF DESCRIPTION OF THE INVENTION

A first aspect of the disclosure provides an internal rib for a blade airfoil, the internal rib partitioning a radially extending chamber for receiving a flow of a coolant within a concave pressure side outer wall and a convex suction side outer wall that connect along leading and trailing edges into a passage having a predetermined cross-sectional area, the internal rib comprising: a concave surface facing a selected one of the pressure side outer wall and the suction side outer wall, the concave surface defined by: a width between a first end of the concave surface and a second, opposing end of the concave surface and a depth defined as a length of a depth line extending between a midpoint of the concave surface between the first end and the second, opposing end and an intersection point of the depth line with the selected one of the pressure side outer wall and the suction side outer wall, an aspect ratio defined as the width divided by the depth, an irregular arc defined within an arc angle centered at the intersection point, the irregular arc having a first arc radius equivalent to the depth at the midpoint of the concave surface and a second arc radius where the arc angle intersects the concave surface equivalent to a product of the depth and a shape factor, the shape factor having a substantially linear relationship with the aspect ratio, and wherein the width, the depth, the shape factor and the arc angle are configured to provide the passage with the predetermined cross-sectional area.

A second aspect of the disclosure provides an internal rib for a blade airfoil, the internal rib partitioning a radially extending chamber for receiving a flow of a coolant within a concave pressure side outer wall and a convex suction side outer wall that connect along leading and trailing edges into a passage having a predetermined cross-sectional area, the internal rib comprising: a concave surface facing a selected one of the pressure side outer wall or the suction side outer wall, the concave surface defined by: a width between a first end of the concave surface and a second, opposing end of the concave surface and a depth defined as a length of a depth line extending between a midpoint of the concave surface between the first end and the second, opposing end and an intersection point of the depth line with the selected one of the pressure side outer wall and the suction side outer wall, an aspect ratio defined as the width divided by the depth, an irregular arc defined within an arc angle centered at the intersection point, the irregular arc having a first arc radius equivalent to the depth at the midpoint of the concave surface and a second arc radius where the arc angle intersects the concave surface equivalent to a product of the depth and a shape factor, the shape factor having a substantially linear relationship with the aspect ratio, wherein the arc angle extends no less than 60 degrees and no more than 120 degrees, centered about the midpoint of the concave surface, wherein the aspect ratio is defined as a sum of: a product of the shape factor and a slope, and a y-intercept, wherein the slope is approximately +3.29 and the y-intercept ranges from −0.89 to −1.89, and wherein the width, the depth, the shape factor and the arc angle are configured to provide the passage with the predetermined cross-sectional area.

The illustrative aspects of the present disclosure are arrangements to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
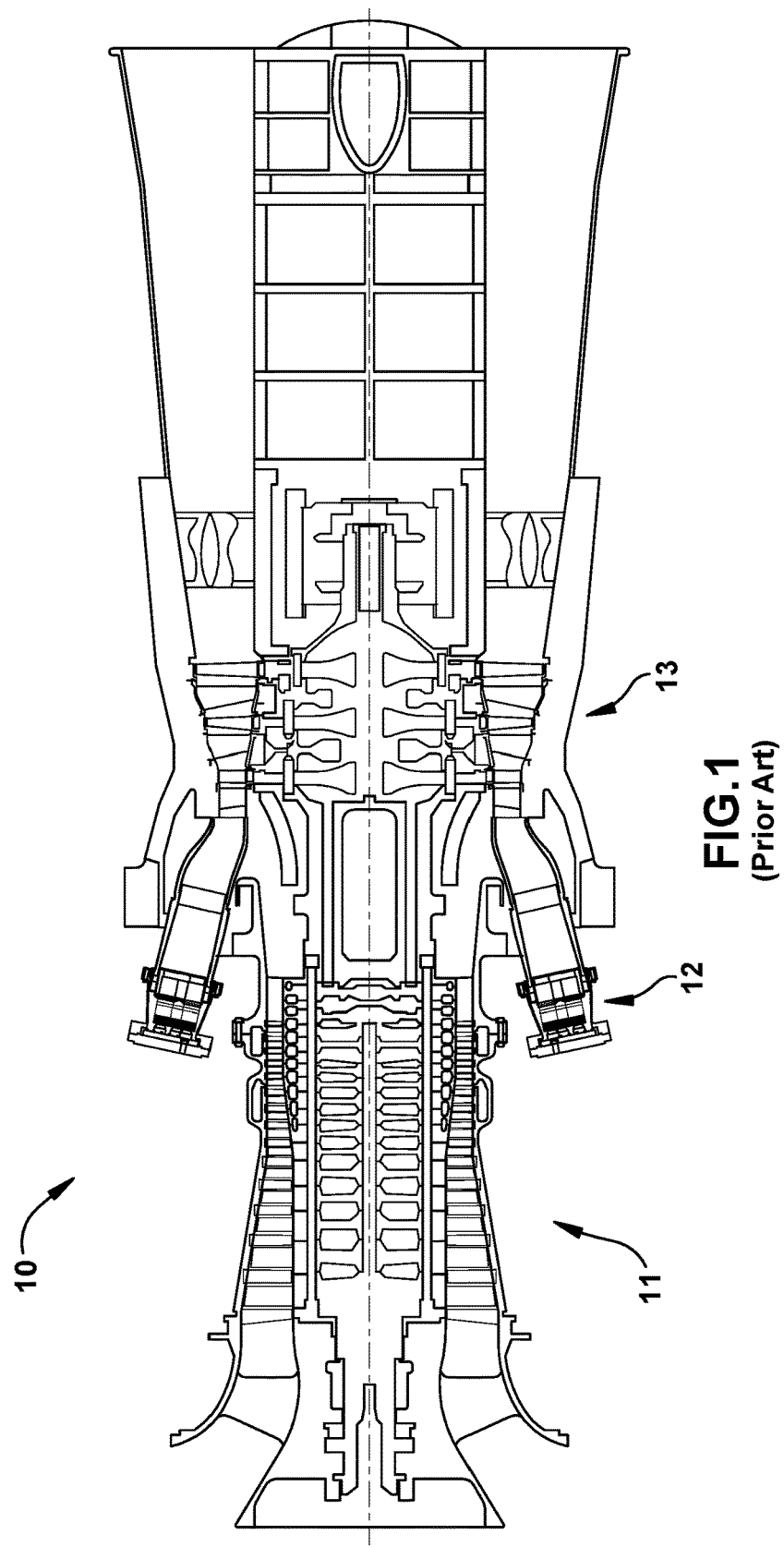
FIG. 1 is a schematic representation of an illustrative turbine engine in which certain embodiments of the present application may be used.

As an initial matter, in order to clearly describe the current disclosure it will become necessary to select certain terminology when referring to and describing relevant machine components within a gas turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft", without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

By way of background, referring now to the figures, FIGS. 1 through 4 illustrate an example combustion turbine engine in which embodiments of the present application may be used. It will be understood by those skilled in the art that the present disclosure is not limited to this particular type of usage. The present disclosure may be used in combustion turbine engines, such as those used in power generation, airplanes, as well as other engine or turbomachine types. The examples provided are not meant to be limiting unless otherwise stated.

FIG. 1 is a schematic representation of a combustion turbine engine 10. In general, combustion turbine engines operate by extracting energy from a pressurized flow of hot gas produced by the combustion of a fuel in a stream of compressed air. As illustrated in FIG. 1, combustion turbine engine 10 may be configured with an axial compressor 11 that is mechanically coupled by a common shaft or rotor to a downstream turbine section or turbine 13, and a combustor 12 positioned between compressor 11 and turbine 13.

Figure 2:
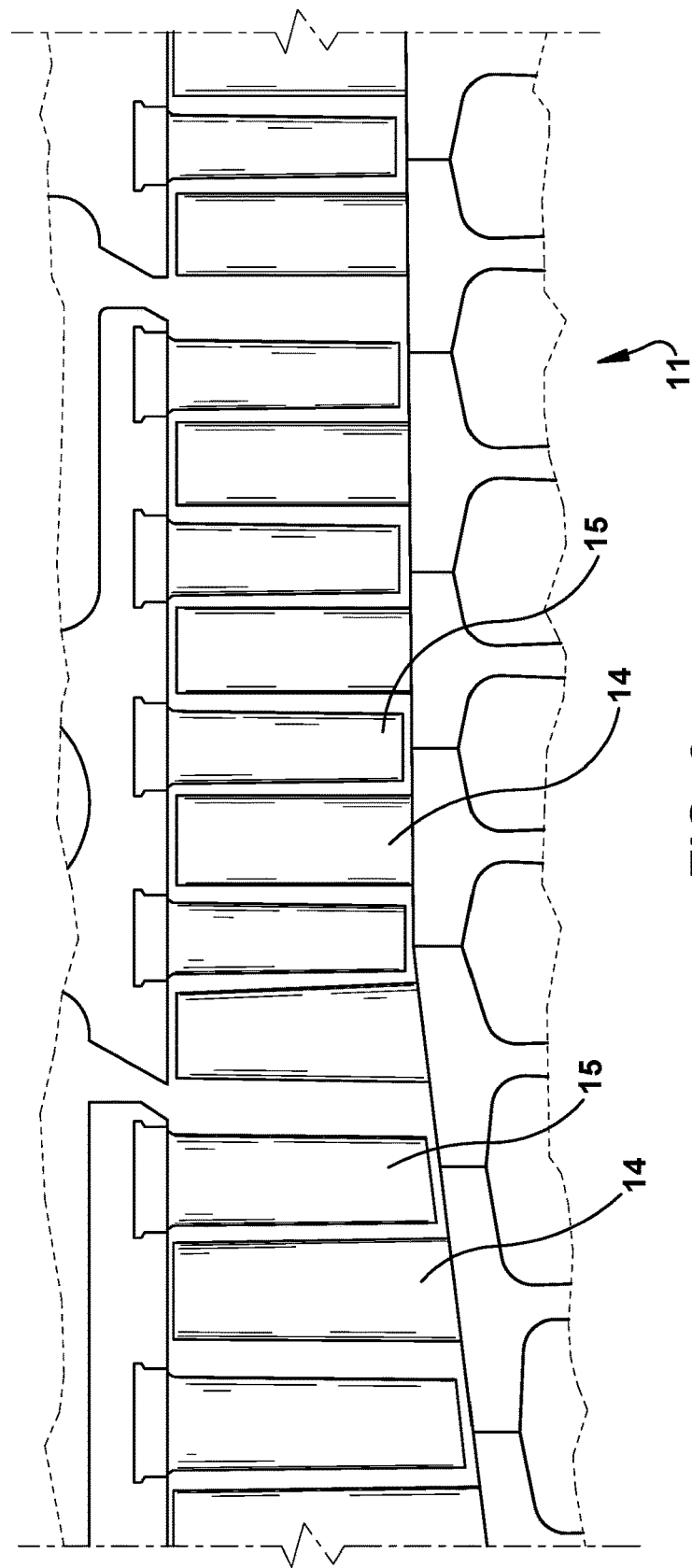
FIG. 2 is a sectional view of the compressor section of the combustion turbine engine of FIG. 1.

FIG. 2 illustrates a view of an illustrative multi-staged axial compressor 11 that may be used in the combustion turbine engine of FIG. 1. As shown, compressor 11 may include a plurality of stages. Each stage may include a row of compressor rotor blades 14 followed by a row of compressor stator blades 15. Thus, a first stage may include a row of compressor rotor blades 14, which rotate about a central shaft, followed by a row of compressor stator blades 15, which remain stationary during operation.

Figure 3:
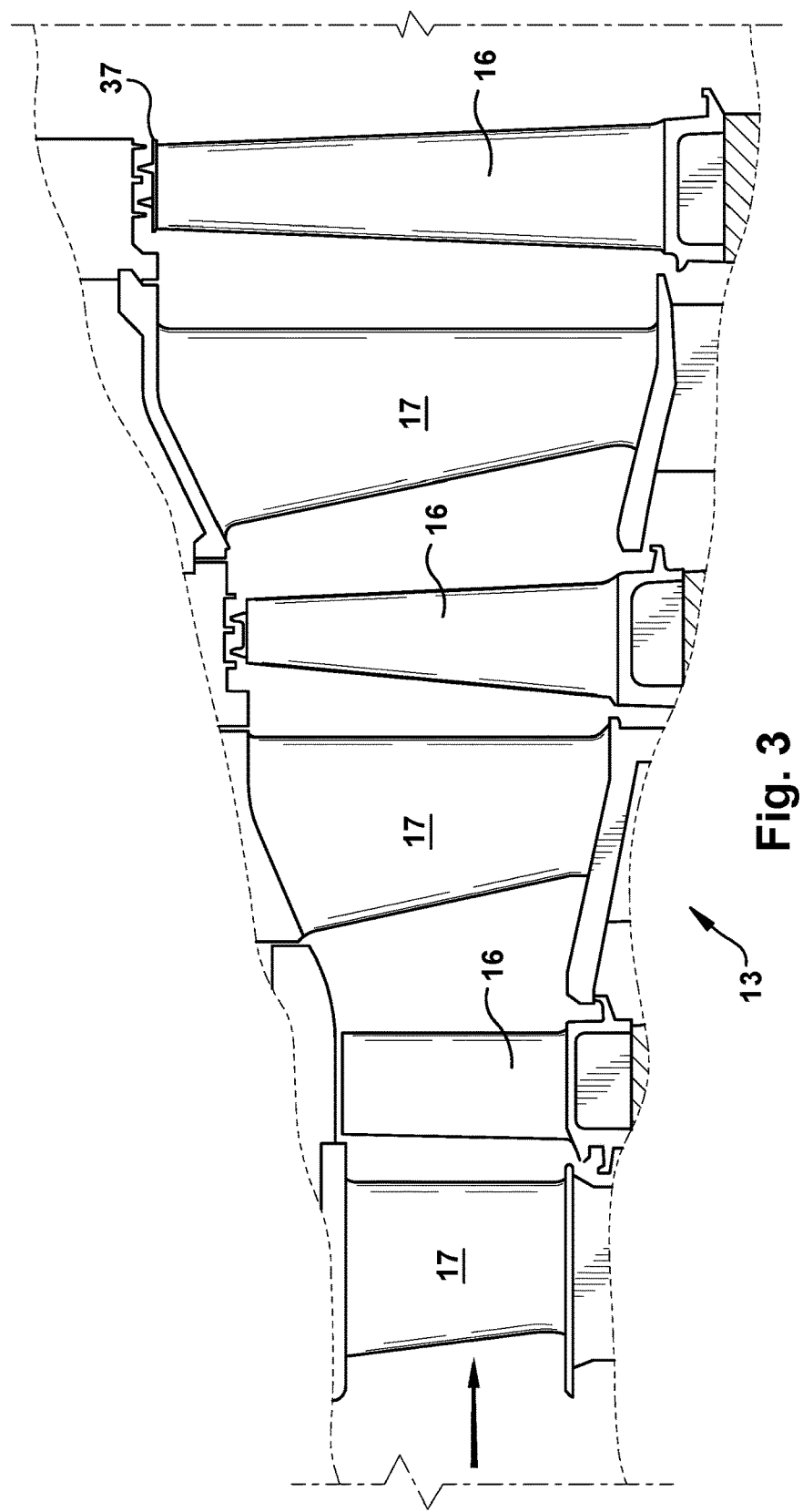
FIG. 3 is a sectional view of the turbine section of the combustion turbine engine of FIG. 1.

FIG. 3 illustrates a partial view of an illustrative turbine section or turbine 13 that may be used in the combustion turbine engine of FIG. 1. Turbine 13 may include a plurality of stages. Three illustrative stages are shown, but more or less stages may be present in the turbine 13. A first stage includes a plurality of turbine buckets or turbine rotor blades 16, which rotate about the shaft during operation, and a plurality of nozzles or turbine stator blades 17, which remain stationary during operation. Turbine stator blades 17 generally are circumferentially spaced one from the other and fixed about the axis of rotation. Turbine rotor blades 16 may be mounted on a turbine wheel (not shown) for rotation about the shaft (not shown). A second stage of turbine 13 also is illustrated. The second stage similarly includes a plurality of circumferentially spaced turbine stator blades 17 followed by a plurality of circumferentially spaced turbine rotor blades 16, which are also mounted on a turbine wheel for rotation. A third stage also is illustrated, and similarly includes a plurality of turbine stator blades 17 and rotor blades 16. It will be appreciated that turbine stator blades 17 and turbine rotor blades 16 lie in the hot gas path of the turbine 13. The direction of flow of the hot gases through the hot gas path is indicated by the arrow. As one of ordinary skill in the art will appreciate, turbine 13 may have more, or in some cases less, stages than those that are illustrated in FIG. 3. Each additional stage may include a row of turbine stator blades 17 followed by a row of turbine rotor blades 16.

In one example of operation, the rotation of compressor rotor blades 14 within axial compressor 11 may compress a flow of air. In combustor 12, energy may be released when the compressed air is mixed with a fuel and ignited. The resulting flow of hot gases from combustor 12, which may be referred to as the working fluid, is then directed over turbine rotor blades 16, the flow of working fluid inducing the rotation of turbine rotor blades 16 about the shaft. Thereby, the energy of the flow of working fluid is transformed into the mechanical energy of the rotating blades and, because of the connection between the rotor blades and the shaft, the rotating shaft rotates. The mechanical energy of the shaft may then be used to drive the rotation of the compressor rotor blades 14, such that the necessary supply of compressed air is produced, and also, for example, a generator to produce electricity.

Figure 4:
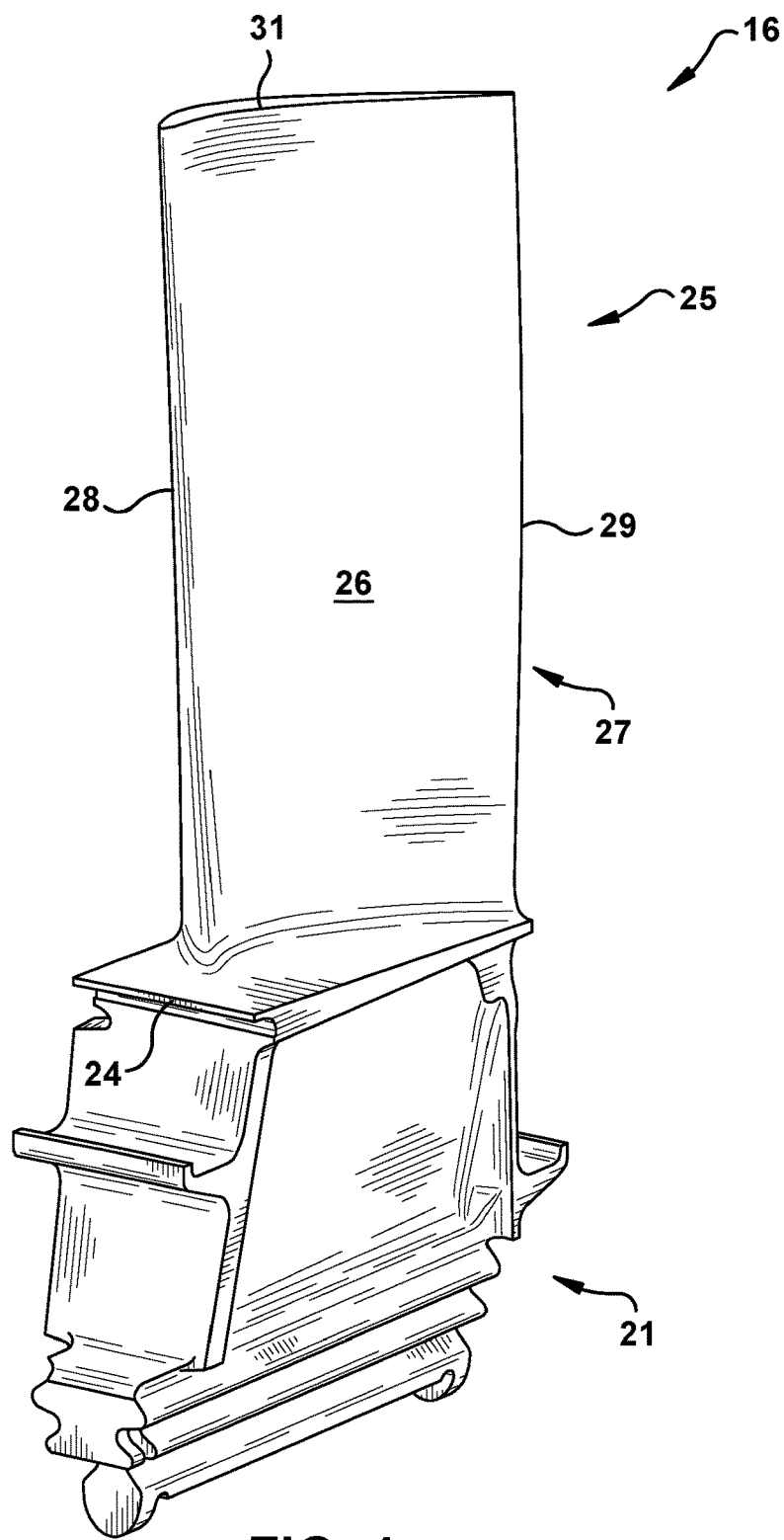
FIG. 4 is a perspective view of a turbine rotor blade of the type in which embodiments of the present disclosure may be employed.

FIG. 4 is a perspective view of a turbine rotor blade 16 of the type in which embodiments of the present disclosure may be employed. Turbine rotor blade 16 includes a root 21 by which rotor blade 16 attaches to a rotor disc. Root 21 may include a dovetail configured for mounting in a corresponding dovetail slot in the perimeter of the rotor disc. Root 21 may further include a shank that extends between the dovetail and a platform 24, which is disposed at the junction of airfoil 25 and root 21 and defines a portion of the inboard boundary of the flow path through turbine 13. It will be appreciated that airfoil 25 is the active component of rotor blade 16 that intercepts the flow of working fluid and induces the rotor disc to rotate. While the blade of this example is a turbine rotor blade 16, it will be appreciated that the present disclosure also may be applied to other types of blades within turbine engine 10, including turbine stator blades 17 (vanes). It will be seen that airfoil 25 of rotor blade 16 includes a concave pressure side (PS) outer wall 26 and a circumferentially or laterally opposite convex suction side (SS) outer wall 27 extending axially between opposite leading and trailing edges 28, 29 respectively. Sidewalls 26 and 27 also extend in the radial direction from platform 24 to an outboard tip 31. (It will be appreciated that the application of the present disclosure may not be limited to turbine rotor blades, but may also be applicable to stator blades (vanes). The usage of rotor blades in the several embodiments described herein is merely illustrative unless otherwise stated.)

Figure 5:
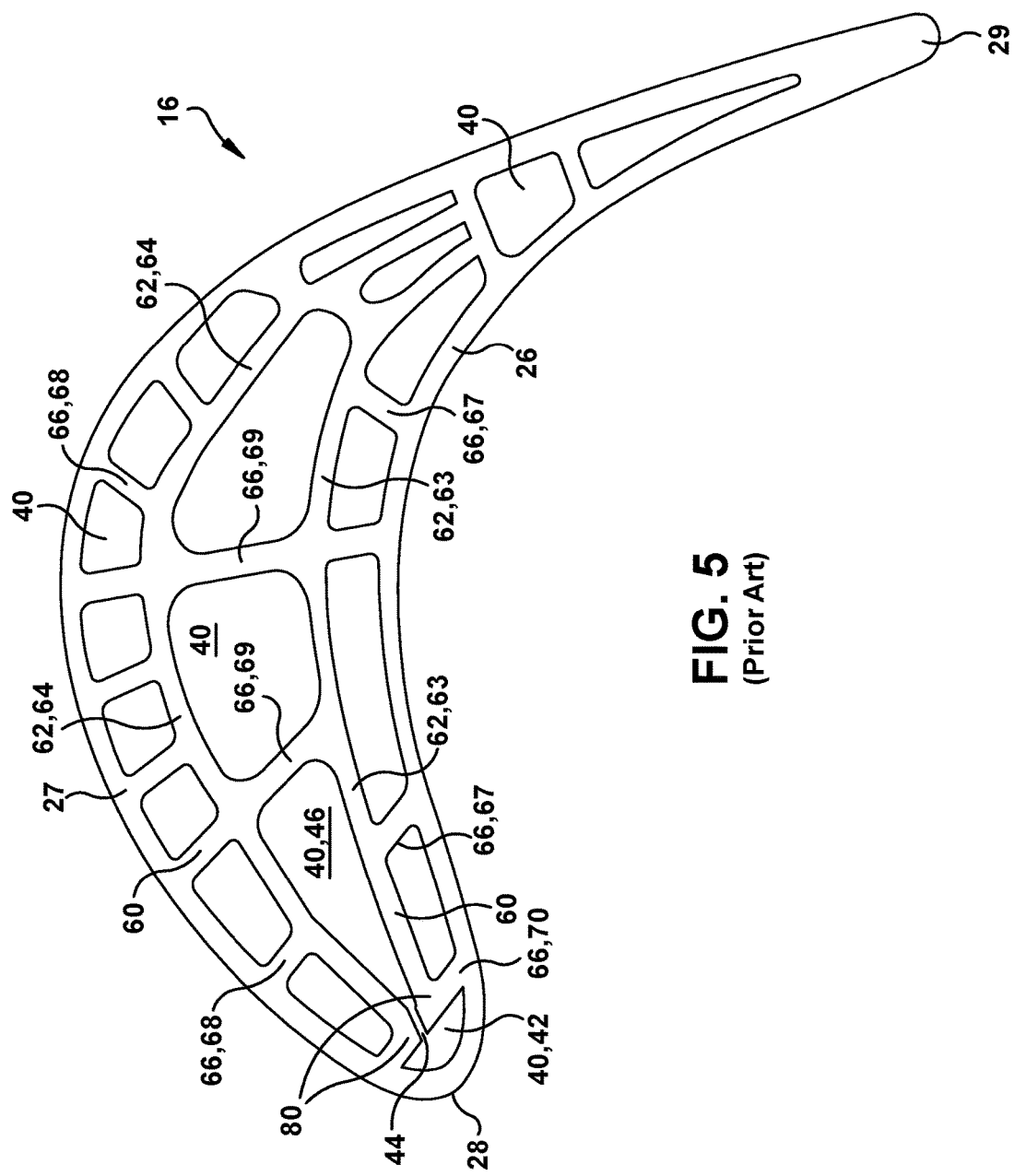
FIG. 5 is a cross-sectional view of a turbine rotor blade having an inner wall or rib configuration according to conventional arrangement.
Figure 6:
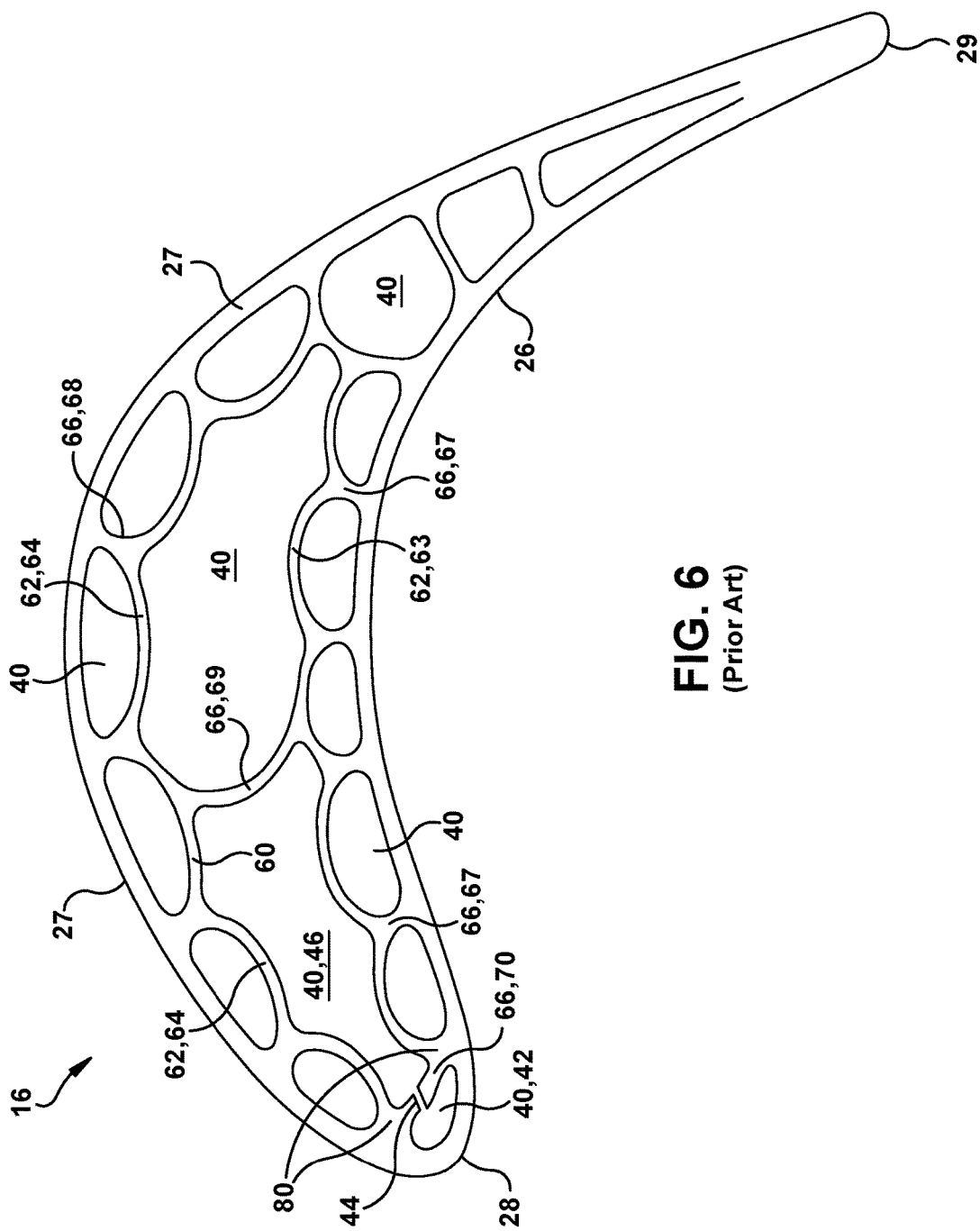
FIG. 6 is a cross-sectional view of a turbine rotor blade having an inner wall configuration according to conventional arrangement.

FIGS. 5 and 6 show two example internal wall constructions as may be found in a rotor blade airfoil 25 having a conventional arrangement. As indicated, an outer surface of airfoil 25 may be defined by a relatively thin pressure side (PS) outer wall 26 and suction side (SS) outer wall 27, which may be connected via a plurality of radially extending and intersecting ribs 60. Ribs 60 are configured to provide structural support to airfoil 25, while also defining a plurality of radially extending and substantially separated flow passages 40. Typically, ribs 60 extend radially so to partition flow passages 40 over much of the radial height of airfoil 25, but the flow passage may be connected along the periphery of the airfoil so to define a cooling circuit. That is, flow passages 40 may fluidly communicate at the outboard or inboard edges of airfoil 25, as well as via a number of smaller crossover passages 44 or impingement apertures (latter not shown) that may be positioned therebetween. In this manner certain of flow passages 40 together may form a winding or serpentine cooling circuit. Additionally, film cooling ports (not shown) may be included that provide outlets through which coolant is released from flow passages 40 onto outer surface of airfoil 25.

Ribs 60 may include two different types, which then, as provided herein, may be subdivided further. A first type, a camber line rib 62, is typically a lengthy rib that extends in parallel or approximately parallel to the camber line of the airfoil, which is a reference line stretching from a leading edge 28 to a trailing edge 29 that connects the midpoints between pressure side outer wall 26 and suction side outer wall 27. As is often the case, the illustrative conventional configuration of FIGS. 5 and 6 include two camber line ribs 62, a pressure side camber line rib 63, which also may be referred to as the pressure side outer wall given the manner in which it is offset from and close to the pressure side outer wall 26, and a suction side camber line rib 64, which also may be referred to as the suction side outer wall given the manner in which it is offset from and close to the suction side outer wall 27. As mentioned, these types of arrangements are often referred to as having a "four-wall" configuration due to the prevalent four main walls that include two outer walls 26, 27 and two camber line ribs 63, 64. It will be appreciated that outer walls 26, 27 and camber line ribs 62 may be formed using any now known or later developed technique, e.g., via casting or additive manufacturing as integral components.

The second type of rib is referred to herein as a traverse rib 66. Traverse ribs 66 are the shorter ribs that are shown connecting the walls and inner ribs of the four-wall configuration. As indicated, the four walls may be connected by a number of traverse ribs 66, which may be further classified according to which of the walls each connects. As used herein, traverse ribs 66 that connect pressure side outer wall 26 to pressure side camber line rib 63 are referred to as pressure side traverse ribs 67. Traverse ribs 66 that connect suction side outer wall 27 to suction side camber line rib 64 are referred to as suction side traverse ribs 68. Transverse ribs 66 that connect pressure side camber line rib 63 to suction side camber line rib 64 are referred to as center traverse ribs 69. Finally, a transverse rib 66 that connects pressure side outer wall 26 and suction side outer wall 27 near leading edge 28 is referred to as a leading edge transverse rib 70. Leading edge transverse rib 70, in FIGS. 5 and 6, also connects to a leading edge end of pressure side camber line rib 63 and a leading edge end of suction side camber line rib 64.

As leading edge transverse rib 70 couples pressure side outer wall 26 and suction side outer wall 27, it also forms passage 40 referred to herein as a leading edge passage 42. Leading edge passage 42 may have similar functionality as other passages 40, described herein. As illustrated, as an option and as noted herein, a crossover passage 44 may allow coolant to pass to and/or from leading edge passage 42 to an immediately aft central passage 46. Cross-over port 44 may include any number thereof positioned in a radially spaced relation between passages 40, 42.

In general, the purpose of any internal configuration in an airfoil 25 is to provide efficient near-wall cooling, in which the cooling air flows in channels adjacent to outer walls 26, 27 of airfoil 25. It will be appreciated that near-wall cooling is advantageous because the cooling air is in close proximity of the hot outer surfaces of the airfoil, and the resulting heat transfer coefficients are high due to the high flow velocity achieved by restricting the flow through narrow channels. However, such arrangements are prone to experiencing low cycle fatigue due to differing levels of thermal expansion experienced within airfoil 25, which, ultimately, may shorten the life of the rotor blade. For example, in operation, suction side outer wall 27 thermally expands more than suction side camber line rib 64. This differential expansion tends to increase the length of the camber line of airfoil 25, and, thereby, causes stress between each of these structures as well as those structures that connect them. In addition, pressure side outer wall 26 also thermally expands more than the cooler pressure side camber line rib 63. In this case, the differential tends to decrease the length of the camber line of airfoil 25, and, thereby, cause stress between each of these structures as well as those structures that connect them. The oppositional forces within the airfoil that, in the one case, tends to decrease the airfoil camber line and, in the other, increase it, can lead to stress concentrations. The various ways in which these forces manifest themselves given an airfoil's particular structural configuration and the manner in which the forces are then balanced and compensated for becomes a significant determiner of the part life of rotor blade 16.

More specifically, in a common scenario, suction side outer wall 27 tends to bow outward at the apex of its curvature as exposure to the high temperatures of the hot gas path cause it to thermally expand. It will be appreciated that suction side camber line rib 64, being an internal wall, does not experience the same level of thermal expansion and, therefore, does not have the same tendency to bow outward. That is, camber line rib 64 and transverse ribs 66 and their connection points resists the thermal growth of the outer wall 27.

Conventional arrangements, an example of which is shown in FIG. 5, have camber line ribs 62 formed with stiff geometries that provide little or no compliance. The resistance and the stress concentrations that result from it can be substantial. Exacerbating the problem, transverse ribs 66 used to connect camber line rib 62 to outer wall 27 may be formed with linear profiles and generally oriented at right angles in relation to the walls that they connect. This being the case, transverse ribs 66 operated to basically hold fast the "cold" spatial relationship between the outer wall 27 and the camber line rib 64 as the heated structures expand at significantly different rates. The little or no "give" situation prevents defusing the stress that concentrates in certain regions of the structure. The differential thermal expansion results in low cycle fatigue issues that shorten component life.

Many different internal airfoil cooling systems and rib configurations have been evaluated in the past, and attempts have been made to rectify this issue. One such approach proposes overcooling outer walls 26, 27 so that the temperature differential and, thereby, the thermal growth differential are reduced. It will be appreciated, though, that the way in which this is typically accomplished is to increase the amount of coolant circulated through the airfoil. Because coolant is typically air bled from the compressor, its increased usage has a negative impact on the efficiency of the engine and, thus, is a solution that is preferably avoided. Other solutions have proposed the use of improved fabrication methods and/or more intricate internal cooling configurations that use the same amount of coolant, but use it more efficiently. While these solutions have proven somewhat effective, each brings additional cost to either the operation of the engine or the manufacture of the part, and does nothing to directly address the root problem, which is the geometrical deficiencies of conventional arrangement in light of how airfoils grow thermally during operation. As shown in one example in FIG. 6, another approach employs certain curving or bubbled or sinusoidal or wavy internal ribs (hereinafter "wavy ribs") that alleviate imbalanced thermal stresses that often occur in the airfoil of blades such as turbine blades. These structures reduce the stiffness of the internal structure of airfoil 25 so to provide targeted flexibility by which stress concentrations are dispersed and strain off-loaded to other structural regions that are better able to withstand it. This may include, for example, off-loading stress to a region that spreads the strain over a larger area, or, perhaps, structure that offloads tensile stress for a compressive load, which is typically more preferable. In this manner, life-shortening stress concentrations and strain may be avoided. A challenge with implementing the wavy profile rib configurations includes identifying the optimized curvature of the rib that will also provide mechanical durability over the life of airfoil 25. Current approaches include reiteratively modeling the curves of the ribs, analyzing the cooling efficiency and then revising the models, which is time consuming and expensive.

In accordance with embodiments of the disclosure, an internal rib is configured according to a number of physical features thereof to optimize rib curvature for desired cooling efficiency and mechanical durability. An internal rib having the characteristics described herein greatly reduces design and drafting cycle time while producing desired rib and passage shapes that meet cooling and mechanical life requirements.

Figure 7:
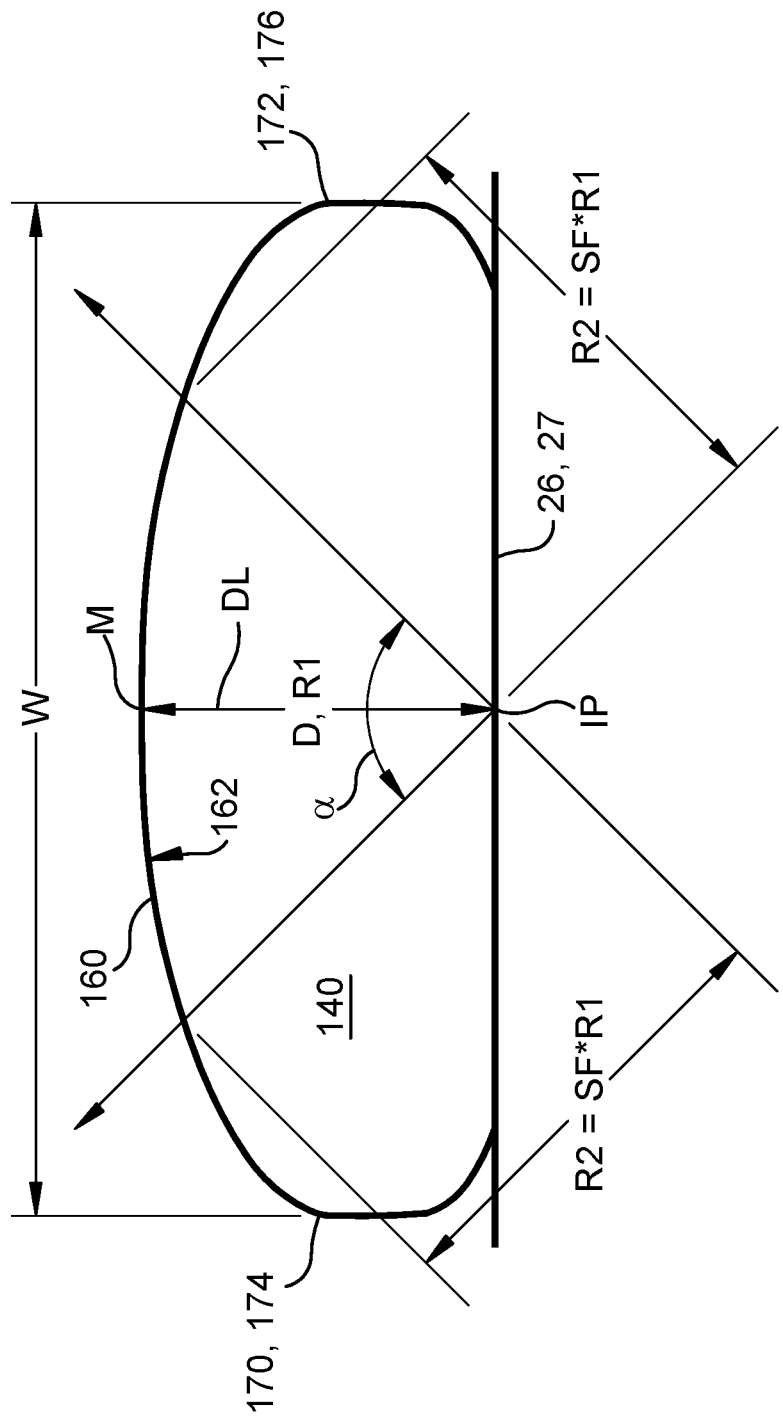
FIG. 7 is a schematic of an internal rib according to embodiments of the present disclosure.

FIG. 7 shows a schematic of an internal rib 160 according to embodiments of the disclosure. Internal rib 160 may be any rib (e.g., 60, 62, 66, etc.) described herein that partitions the radially extending chamber for receiving a flow of a coolant within concave pressure side outer wall 26 or convex suction side outer wall 27. As described, outer walls 26, 27 connect along leading edge 28 (FIGS. 5-6) and trailing edge 29 (FIGS. 5-6). Internal rib 160 partitions the radially extending chamber into passages 40 (e.g., FIG. 6) having a predetermined cross-sectional area. The cross-sectional area of each passage 140 may be determined in any now known or later developed fashion. For example, a length of an outer wall 26, 27 can be identified for a particular airfoil 25, and the number of passages 140 to be provided along each wall selected, e.g., 4-7. In addition, the volume flow of coolant therethrough (into or out of page) desired to provide the necessary heat transfer at the location of each passage 140 can be calculated in a conventional manner so as to lead to the desired predetermined cross-sectional area for each passage 140.

Rib 160 includes a concave surface 162 facing a selected one of pressure side outer wall 26 and suction side outer wall 27. In accordance with embodiments of the disclosure, concave surface 162 is defined to ensure the desired predetermined cross-sectional area of passage 140 and durability of rib 160. More particularly, concave surface 162 has a number of physical attributes or characteristics that are set to ensure that the rib 160 that forms passage 140, of a predetermined cross-sectional area, is durable. As the shape of concave surface 162 is arranged according to embodiments of the disclosure in the same manner regardless of whether applied to pressure side outer wall 26 and suction side outer wall 27, they are denoted collectively as outer wall 26, 27 in FIG. 7.

As an initial matter, in order to clearly describe the current embodiments it will become necessary to select certain terminology when referring and describing physical attributes of concave surface 162. To this end, the following definitions will be applied with reference to concave surface 162: "Width" W is defined as a distance between a first end 170 of the concave surface 162 and a second, opposing end 172 of concave surface 162. "First end" 170 and "second, opposing end" 172 may be defined as respective points on concave surface 162 closest to leading edge 28 or trailing edge 29, depending on the perspective of the viewer. That is, first end 170 of concave surface 162 is defined as a point 174 on concave surface 162 closest to one of leading edge 28 (FIG. 6) and trailing edge 29 (FIG. 6), and second, opposing end 172 of concave surface 162 is defined as a point 176 on concave surface 162 closest to the other of leading edge 28 (FIG. 6) and trailing edge 29 (FIG. 6). These points 174, 176 may be locations at which concave surface 162 stops being defined as described herein and transitions to another curvature, i.e., the surface turns sufficiently to extend toward wall 26, 27, in a convex manner, with a different radius, etc., but this is not the case in all instances. "Depth" D is defined as a length of a depth line DL extending between a midpoint M of concave surface 162 between first end 170 and second, opposing end 172 and an intersection point IP of depth line DL with the selected one of pressure side outer wall 26 and suction side outer wall 27. Depth line DL is perpendicular to the selected one of pressure side outer wall 26 and suction side outer wall 27 at intersection point IP. "Aspect ratio" is defined as width W divided by depth D.

Concave surface 162 includes an irregular arc, which is an arc not having a uniform radius of curvature. In embodiments of the disclosure, an arc angle α is centered at intersection point IP. For a particular airfoil 25 (FIG. 6), an arc angle α may be selected, and maintained. In one embodiment, arc angle α may be no less than 60 degrees and no more than 120 degrees, and is in any event, centered about depth line DL. In the example shown, arc angle α is approximately 90 degrees. In another example, arc angle α may be approximately 45 degrees. The irregular arc of concave surface 162 is defined in one aspect as having a first arc radius R1 that is equivalent to depth D at midpoint M of concave surface 162. In another aspect, the irregular arc has a second arc radius R2 where arc angle α intersects concave surface 162. Second arc radius R2 is equivalent to a product of depth D and a shape factor SF.

In accordance with embodiments of the disclosure, shape factor SF has a substantially linear relationship with the aspect ratio. In this manner, as an aspect ratio of a passage 140 increases, i.e., it gets less deep (depth D decreases) and wider (width D increases), the shape factor SF also increases, forcing a spread of the irregular arc of concave surface 162 to increase. The increased spread of the irregular arc of concave surface 162 gives rib 160 more flexibility and thus durability because rib 160 becomes less rounded in its center and more rounded at second arc radius R2, i.e., where arc angle α intersects concave surface 162. Meanwhile, width W, depth D, shape factor SF and arc angle α are configured to provide passage 140 with the predetermined cross-sectional area, which maintains the desired heat transfer. That is, width W, depth D, shape factor SF and arc angle α can be selected, e.g., in a conventional iterative process, to provide the predetermined cross-sectional area using a concave surface 162 shaped as described herein.

Figure 8:
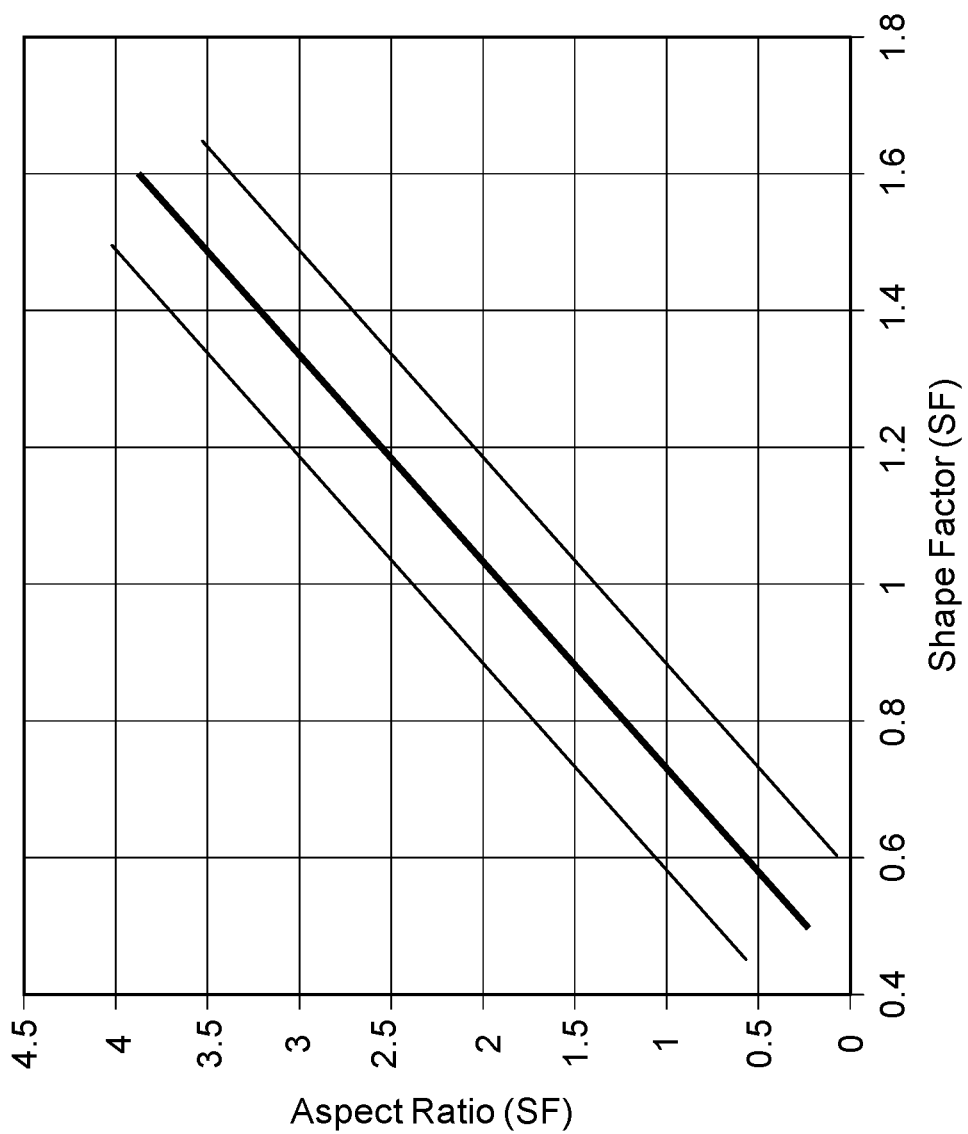
FIG. 8 is a graphical representation of relationship between an aspect ratio and shape factor used to define the internal rib according to embodiments of the present disclosure.

In terms of the substantially linear relationship, the aspect ratio may be defined as a sum of: a product of shape factor SF and a slope, and a y-intercept. In one embodiment, the slope may be approximately +3.29 and the y-intercept may be −1.39 with the y-intercept having a range of +/−0.5, i.e., the y-intercept may range ranges from −0.89 to −1.89. As such, the qualifier "substantially" is defined as provided by the ranges presented. FIG. 8 shows a graphical representation of one illustrative relationship of aspect ratio (AR) to shape factor (SF). Aspect ratio on the Y axis and shape factor is on the X axis. Here, a best fit line (center line) provides a slope of +3.29 and a y-intercept of −1.39. The uppermost line has a y-intercept of −0.89 and lowermost line has a y-intercept of −1.89, and thus indicate some of the variation of the substantial linear relationship in terms of the y-intercept.

Each passage 140 within airfoil 26 may have a concave surface 162 as defined herein but with a different width W determined by the number passages 140 desired for an outer wall 26, 27 and the heat transfer, i.e., predetermined cross-sectional area, desired. Once concave surface 162 is defined, curves from concave surface 162 to outer wall 26, 27 may be defined using any now known or later developed solution.

Embodiments of the disclosure standardize internal rib 160 shape such that optimized passage shapes are implemented in a short design cycle time, but with desired heat transfer and durability. The configuration of internal rib 160 as described herein may be applicable to the actual finished rib, or to a casting core.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An internal rib for a blade airfoil, the internal rib partitioning a radially extending chamber for receiving a flow of a coolant within a concave pressure side outer wall and a convex suction side outer wall that connect along leading and trailing edges into a passage having a predetermined cross-sectional area, the internal rib comprising:
   a concave surface facing a selected one of the pressure side outer wall or the suction side outer wall, the concave surface defined by:
      a width between a first end of the concave surface and a second, opposing end of the concave surface and a depth defined as a length of a depth line extending between a midpoint of the concave surface between the first end and the second, opposing end and an intersection point of the depth line with the selected one of the pressure side outer wall and the suction side outer wall,
      an aspect ratio defined as the width divided by the depth,
      an irregular arc defined within an arc angle centered at the intersection point, the irregular arc having a first arc radius equivalent to the depth at the midpoint of the concave surface and a second arc radius where the arc angle intersects the concave surface equivalent to a product of the depth and a shape factor, the shape factor having a substantially linear relationship with the aspect ratio, and
      wherein the width, the depth, the shape factor and the arc angle are configured to provide the passage with the predetermined cross-sectional area.

2. The internal rib of claim 1, wherein the arc angle extends no less than 60 degrees and no more than 120 degrees, centered about the midpoint of the concave surface.

3. The internal rib of claim 1, wherein the first end of the concave surface is defined as a point on the concave surface closest to one of the leading edge or the trailing edge, and the second, opposing end of the concave surface is defined as a point on the concave surface closest to the other of the leading edge or the trailing edge.

4. The internal rib of claim 1, wherein the aspect ratio is defined as a sum of: a product of the shape factor and a slope, and a y-intercept, wherein the slope is approximately +3.29 and the y-intercept ranges from −0.89 to −1.89.

5. An internal rib for a blade airfoil, the internal rib partitioning a radially extending chamber for receiving a flow of a coolant within a concave pressure side outer wall and a convex suction side outer wall that connect along leading and trailing edges into a passage having a predetermined cross-sectional area, the internal rib comprising:
   a concave surface facing a selected one of the pressure side outer wall or the suction side outer wall, the concave surface defined by:
      a width between a first end of the concave surface and a second, opposing end of the concave surface and a depth defined as a length of a depth line extending between a midpoint of the concave surface between the first end and the second, opposing end and an intersection point of the depth line with the selected one of the pressure side outer wall and the suction side outer wall,
      an aspect ratio defined as the width divided by the depth,
   an irregular arc defined within an arc angle centered at the intersection point, the irregular arc having a first arc radius equivalent to the depth at the midpoint of the concave surface and a second arc radius where the arc angle intersects the concave surface equivalent to a product of the depth and a shape factor, the shape factor having a substantially linear relationship with the aspect ratio, wherein the arc angle extends no less than 60 degrees and no more than 120 degrees, centered about the midpoint of the concave surface,
      wherein the aspect ratio is defined as a sum of: a product of the shape factor and a slope, and a y-intercept, wherein the slope is approximately +3.29 and the y-intercept ranges from −0.89 to −1.89, and
      wherein the width, the depth, the shape factor and the arc angle are configured to provide the passage with the predetermined cross-sectional area.

6. The internal rib of claim 5, wherein the first end of the concave surface is defined as a point on the concave surface closest to one of the leading edge and the trailing edge, and the second, opposing end of the concave surface is defined as a point on the concave surface closest to the other of the leading edge or the trailing edge.

* * * * *